Oct. 15, 1929.  L. W. COPPOCK  1,731,765
MOTOR VEHICLE
Filed March 26, 1925   2 Sheets-Sheet 1
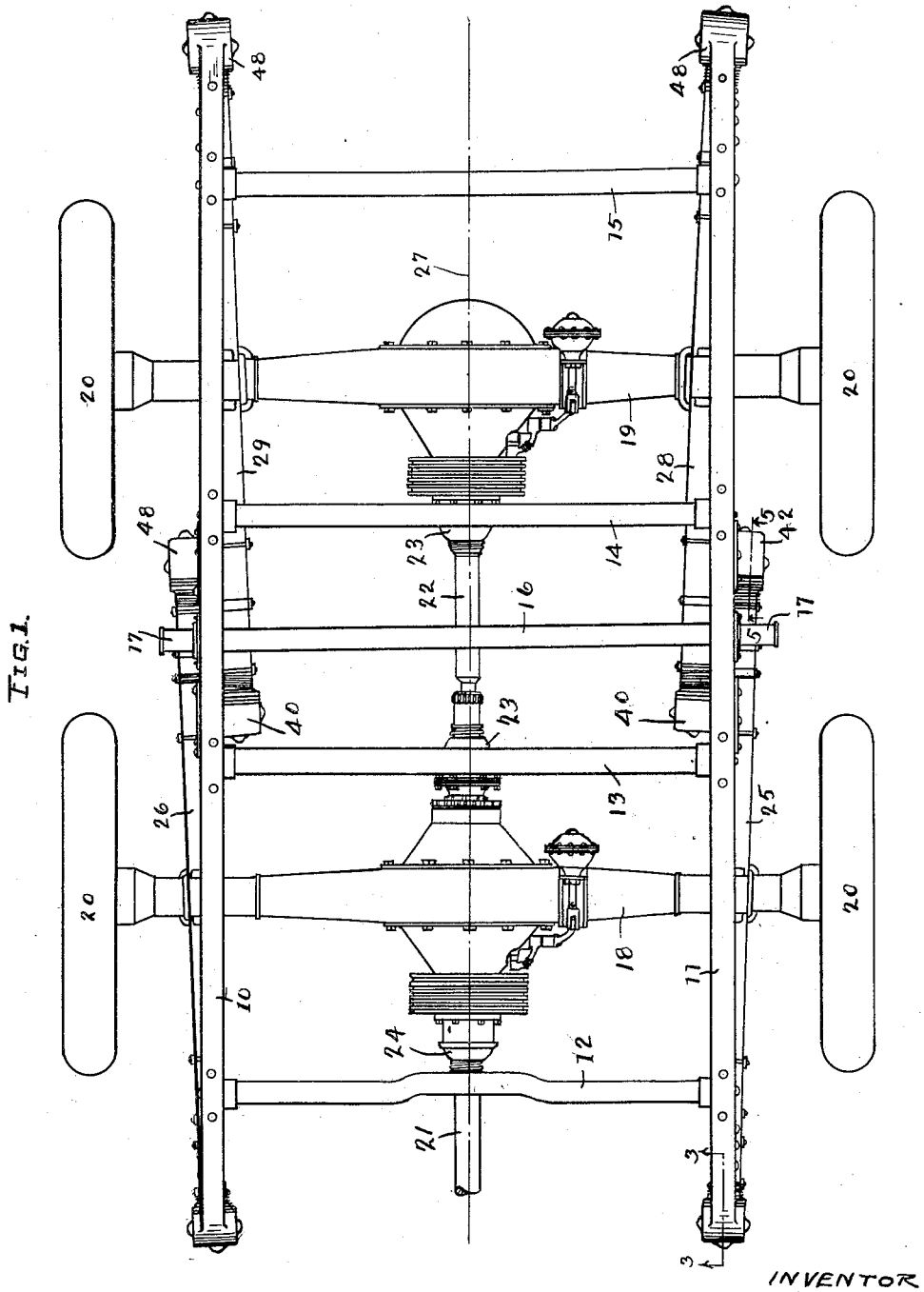
INVENTOR
L. W. COPPOCK
ATTORNEY.

Oct. 15, 1929.  L. W. COPPOCK  1,731,765
MOTOR VEHICLE
Filed March 26, 1925  2 Sheets-Sheet 2
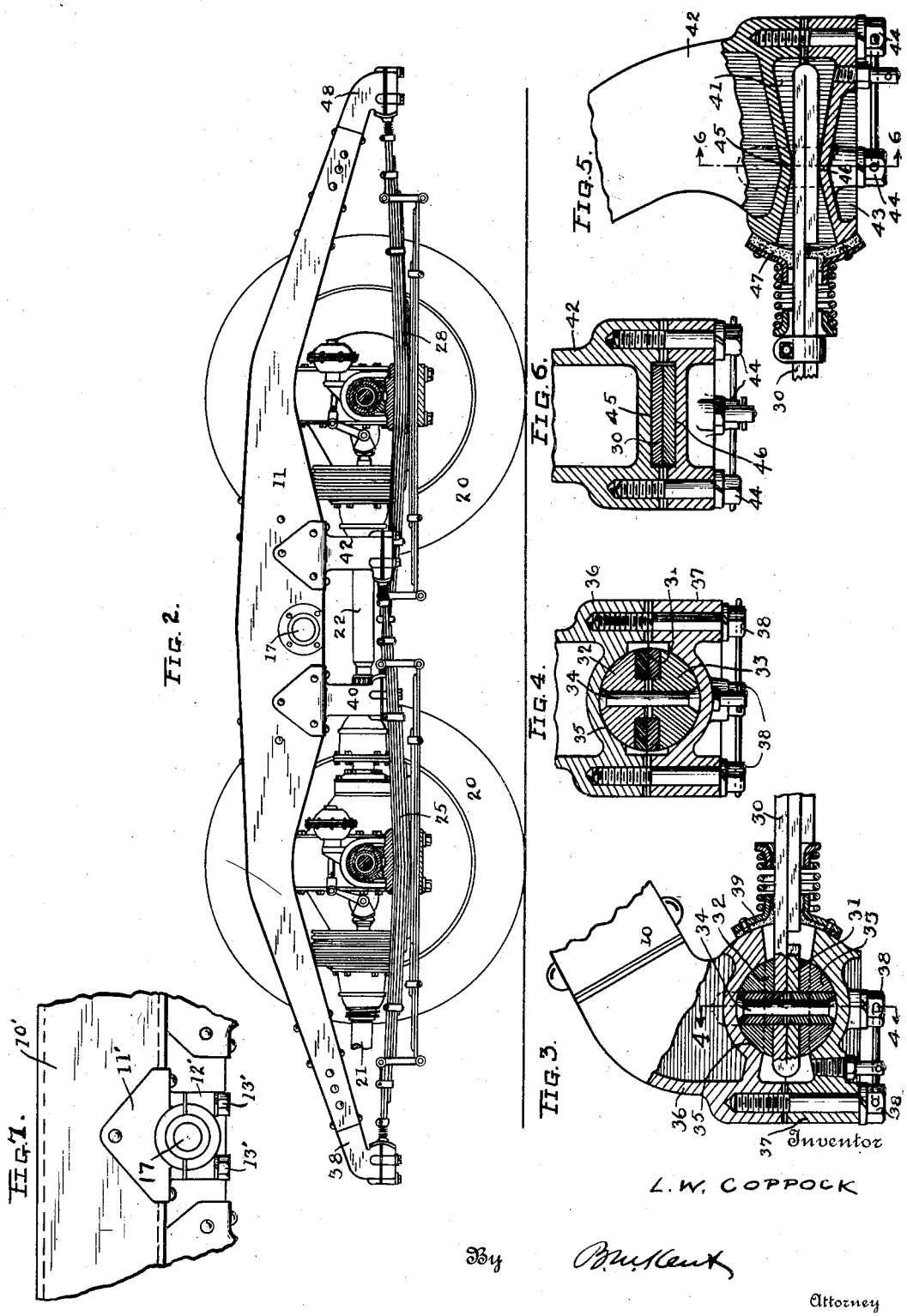
Inventor
L. W. COPPOCK
By
Attorney Patented Oct. 15, 1929

1,731,765

UNITED STATES PATENT OFFICE

LEMBERT W. COPPOCK, OF CLEVELAND, OHIO, ASSIGNOR OF ONE-HALF TO ARTHUR L. KROESEN, OF CLEVELAND, OHIO

MOTOR VEHICLE

Application filed March 26, 1925. Serial No. 18,399.

This invention relates to motor vehicles and more particularly to busses and trucks having six or more wheels.

It is one of the objects of the invention to provide a sub-frame unit for the driving axles of the vehicle in which the sub-frame is mounted on the axles by means of relatively long springs through which the driving forces are transmitted to the sub-frame and in which the arrangement of the springs is such as to provide a very flexible mounting for the sub-frame that will give easy riding qualities to the vehicle.

Other objects of the invention and the features of novelty will be apparent from the following description taken in connection with the accompanying drawings, of which:

Figure 1 is a plan view of a unit comprising a sub-frame and two driving axles, the unit embodying my invention;

Fig. 2 is a side elevation thereof with one pair of wheels removed;

Fig. 3 is an enlarged detail section on the line 3—3 of Fig. 1;

Fig. 4 is an enlarged detail section on the line 4—4 of Fig. 3;

Fig. 5 is a transverse section on the line 5—5 of Fig. 1;

Fig. 6 is a transverse section on the line 6—6 of Fig. 5; and

Figure 7 is a detail elevation of the connection between the main frame of the vehicle and the sub-frame.

Referring to the drawings the sub-frame comprises the side members 10 and 11 which are rigidly connected by the cross members 12, 13, 14 and 15, the side members carrying a cross shaft 16 having trunnions 17 at its ends for connection with the main frame of the vehicle 10'. Each of the trunnions 17 seats in a bearing bracket 11' secured to the main frame 10' and is held therein by a cap 12' that is removably secured to this bearing bracket by bolts 13', so that upon removal of the bolts 13' and the caps 12' the sub-frame and parts assembled therewith may be removed, as a unit, and readily replaced by another unit. This change may be conveniently made on the road, or elsewhere, without tying-up the vehicle for more than a very short time and is, therefore, of especial advantage when a break-down or trouble occurs in any part of the unit.

Associated with the sub-frame there is a pair of driving axles 18 and 19 having road wheels 20 at their ends. A propeller shaft is indicated at 21, this shaft transmitting the power of the vehicle motor to the axle 18 and the power is transmitted from the axle 18 to the axle 19 by means of the shaft 22 and the usual universal joints 23. The arrangement of the gearing and shafts, in the axles 18 and 19, is not shown because this forms no part of the present invention and is well understood by those skilled in the art. The shaft 21 will be flexibly connected with the axle 18 by a universal joint which is represented at 24.

The forward end of the sub-frame is supported on the axle 18 by means of the pair of leaf springs 25 and 26 which, as shown in Fig. 1, are arranged in vertical planes at an angle to a vertical plane through the longitudinal axis 27. In a similar manner the rearward portion of the sub-frame is supported on the axle 19 by means of the pair of leaf springs 28 and 29. The spring 28 is arranged parallel with the spring 25 and the spring 29 is arranged parallel with the spring 26. This arrangement of the springs on either side of the sub-frame permits the adjacent ends to be in overlapped relation, as best shown in Fig. 1, so that the combined length of the springs 25 and 28, as well as the springs 26 and 29, is substantially greater than the length of the side members 10 and 11, thereby providing an exceptionally flexible spring mounting in connection with a relatively short sub-frame.

In order to give additional flexibility to the spring mounting and to reduce the torsional strains on the springs to a minimum and thereby minimize breakage, I utilize the forms of connection between the ends of the springs and the side members of the sub-frame, that are disclosed in my co-pending application No. 6,711, filed February 4, 1925. These forms of connection are shown in detail in Figs. 3 to 6. It will be noted, from Fig. 2, that I disclose a novel form of leaf spring construction, in the springs 25 and 28, but I do not herein claim this particular type of spring construction, this forming the subject-matter of another application for patent. The form of the connections between the ends of the leaf springs, and the side members of the sub-frame, are not confined to the particular type of leaf spring illustrated in Fig. 2 but are equally applicable to the ordinary form of multiple-leaf spring.

In Figs. 3 and 4, I have illustrated the form of connection between the forward ends of the leaf springs and the side members of the sub-frame whereby universal movement of the forward ends of the springs, relatively to the frame members, is permitted and these connections are also adapted to transmit the driving forces from the springs to the side members of the frame. Referring to Figs. 3 and 4, it will be noted that the main leaf 30, of the spring 25, has its end portion folded back upon itself, as indicated at 31, and carries the substantially hemi-spherical members 32 and 33 on its upper and lower sides which are permanently secured to the end of the spring by means of the rivet 34. The members 32 and 33 thus form a ball which fits a spherical socket 35 formed between the horn 36, on the end of the frame member 10, and the cap 37, this cap being secured in position by the bolts 38. A device for excluding dust and retaining lubricant in the socket 35, is indicated at 39. All of these parts are fully described and illustrated in the aforesaid application, No. 6,711. The forward ends of the springs 28 and 29 are connected with brackets 40 by universal joints similar to that just described. It will be readily understood that these universal joint connections permit the ends of the springs to swivel in all directions about the center of the sphere formed by the members 32 and 33, thereby avoiding torsional strains in the forward ends of the springs. These universal joint connections, as will be readily understood, are also adapted to transmit end thrusts between the springs and the side members of the frame.

The form of connection, which I provide between the rearward ends of the springs and the side members of the frame, is illustrated in Figs. 5 and 6 and in this construction the ends of the main leaves 30 are folded back upon themselves and entered in a cavity 41 between the horn 42 and its cap 43, the cap being secured by bolts 44. The upper and lower walls of the cavity 41 are provided with the ridges 45 and 46, respectively, which engage the upper and lower surface of the end portion of the main leaf 30 so as to permit the latter to rock thereon as the spring deflects. The engagement of the end of the spring with the ridges 45 and 46 provides for a certain amount of sliding movement of the spring on these ridges to accommodate the lengthening and shortening of the spring due to its deflections. A device for excluding dust from the cavity 41 and retaining lubricant therein is indicated at 47. The rearward ends of the springs 28 and 29 are connected with the brackets 48 in a manner similar to that just described.

From the foregoing it will be seen that I have provided a form of spring mounting for a multiple-axle driving unit that will have unusual flexibility and permit either axle to move freely, independently of the other and that the unit, as a whole, will give easy riding qualities to the vehicle because the movements of the ends of the axles will have a minimum effect on the unit.

Having thus described my invention, what I claim is:

1. In motor vehicles, a frame unit comprising side members, a plurality of driving axles associated therewith, road wheels at the ends of each of said axles, and a pair of springs for supporting said frame on each of said axles, said springs being arranged longitudinally of the vehicle in planes at angles to the longitudinal axis of the vehicle and the adjacent ends of the springs associated with the different axles being in overlapped relation, and one end of each of said springs being arranged in the plane of and pivotally connected to one of said side members.

2. In motor vehicles, the combination of a frame unit comprising side members, a pair of driving axles associated therewith, road wheels at the ends of each of said axles, a pair of leaf springs for supporting said frame on each of said axles and through which the driving forces are transmitted, the relatively remote ends of said springs having universal joint connections with the ends of side members adapted to transmit the driving forces, and the relatively adjacent ends of said springs being longitudinally movable relative to the side members.

3. In motor vehicles, the combination of a frame unit comprising side members, a pair of driving axles associated therewith, road wheels at the ends of each of said axles, a pair of leaf springs for supporting said frame on each of said axles and through which the driving forces are transmitted, the relatively remote ends of said springs having universal joint connections with the ends of side members adapted to transmit the driving forces, the relatively adjacent ends of said springs being longitudinally movable relative to the side members and the combined length of the springs connected with each side member being substantially greater than the length of said member.

4. In motor vehicles, the combination of a sub-frame unit comprising side members, a pair of driving axles associated therewith, road wheels at the ends of each of said axles, a pair of leaf springs for supporting said frame on each of said axles and through which the driving forces are transmitted, the relatively remote ends of said springs having universal joint connections with said side members adapted to transmit the driving forces, the relatively adjacent ends of said springs being longitudinally movable relative to the side members and the springs connected with each side member being arranged in parallel planes at an angle to the longitudinal axis of the vehicle and having their adjacent ends in overlapped relation.

In testimony whereof I affix my signature.

LEMBERT W. COPPOCK.